US008732790B2

(12) United States Patent
Qu

(10) Patent No.: US 8,732,790 B2
(45) Date of Patent: May 20, 2014

(54) SYSTEM AND METHOD FOR PROVIDING A HIGH PERFORMANCE NETWORK CONNECTION SERVICE FOR DISTRIBUTED COMPUTING APPLICATIONS

(75) Inventor: Yujiang Qu, Ashburn, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 185 days.

(21) Appl. No.: 12/841,787

(22) Filed: Jul. 22, 2010

(65) Prior Publication Data

US 2012/0023545 A1    Jan. 26, 2012

(51) Int. Cl.
  *G06F 17/00*    (2006.01)
  *H04L 29/06*    (2006.01)

(52) U.S. Cl.
  USPC ............................................. 726/1; 709/226

(58) Field of Classification Search
  USPC ............................................................. 726/1
  See application file for complete search history.

(56) References Cited

U.S. PATENT DOCUMENTS

| | | | | |
|---|---|---|---|---|
| 5,805,593 | A * | 9/1998 | Busche | 370/396 |
| 2004/0162871 | A1* | 8/2004 | Pabla et al. | 709/201 |
| 2005/0251604 | A1* | 11/2005 | Gerig | 710/120 |
| 2008/0240150 | A1* | 10/2008 | Dias et al. | 370/465 |

OTHER PUBLICATIONS

Guok et al, A User Driven Dynamic Circuit Network Implementation, Dec. 2008, IEEE Globecom 2008.*
Yang et al, Policy-Based Resource Management and Service Provisioning in GMPLS Networks, Apr. 2006, IEEE Infocom 2006.*
Lehman et al, DRAGON: A Framework for Service Provisioning in Heterogenous Grid Networks, Mar. 2006, IEEE Communications Magazine, pp. 84-90).*

* cited by examiner

*Primary Examiner* — Brian P Whipple
(74) *Attorney, Agent, or Firm* — Andrews Kurth LLP; Sean S. Wooden; Matthew J. Esserman

(57) ABSTRACT

A system and method are disclosed for providing a high performance network connection service (HPNCS) for distributed computing applications. The HPNCS provides a network abstraction layer to the distributed applications and provides an interface to the underlying high performance on-demand dynamic circuit network (DCN). The HPNCS may relieve performance bottleneck problems encountered by the distributed applications due to the limited available networking bandwidth. The HPNCS may be used by distributed applications that need to access dedicated high performance network connection resources, such as DCN circuits, on an as-needed basis without over consuming expensive network resources.

17 Claims, 5 Drawing Sheets

SYSTEM AND METHOD FOR PROVIDING A HIGH PERFORMANCE NETWORK CONNECTION SERVICE FOR DISTRIBUTED COMPUTING APPLICATIONS

BACKGROUND

As networking technology advances and more high performance networking products are deployed, high performance networks will play an increasingly important role in the success of mission critical, net-centric operations. This is especially true since data volumes and near real-time data processing requirements continue to rise. However, learning how to leverage the high performance networking capability remains a challenge for distributed application developers.

It is challenging for user devices to easily access network resources that allow end user applications to transfer data from source to destination, or to easily access data over wide area networks with high bandwidth and low latency. Network resource provisioning has always been difficult and time consuming. In addition, high performance network connection resources are often not directly accessible to user devices. For example, multiple manual configurations are required to establish point-to-point connections for user devices to access remote data over a wide area network (WAN). The inability to establish point-to-point connections on-demand over networks limits certain applications' efficient use of network resources.

DESCRIPTION OF THE DRAWINGS

The detailed description will refer to the following drawings, wherein like numerals refer to like elements, and wherein.

DETAILED DESCRIPTION

Figure 1:
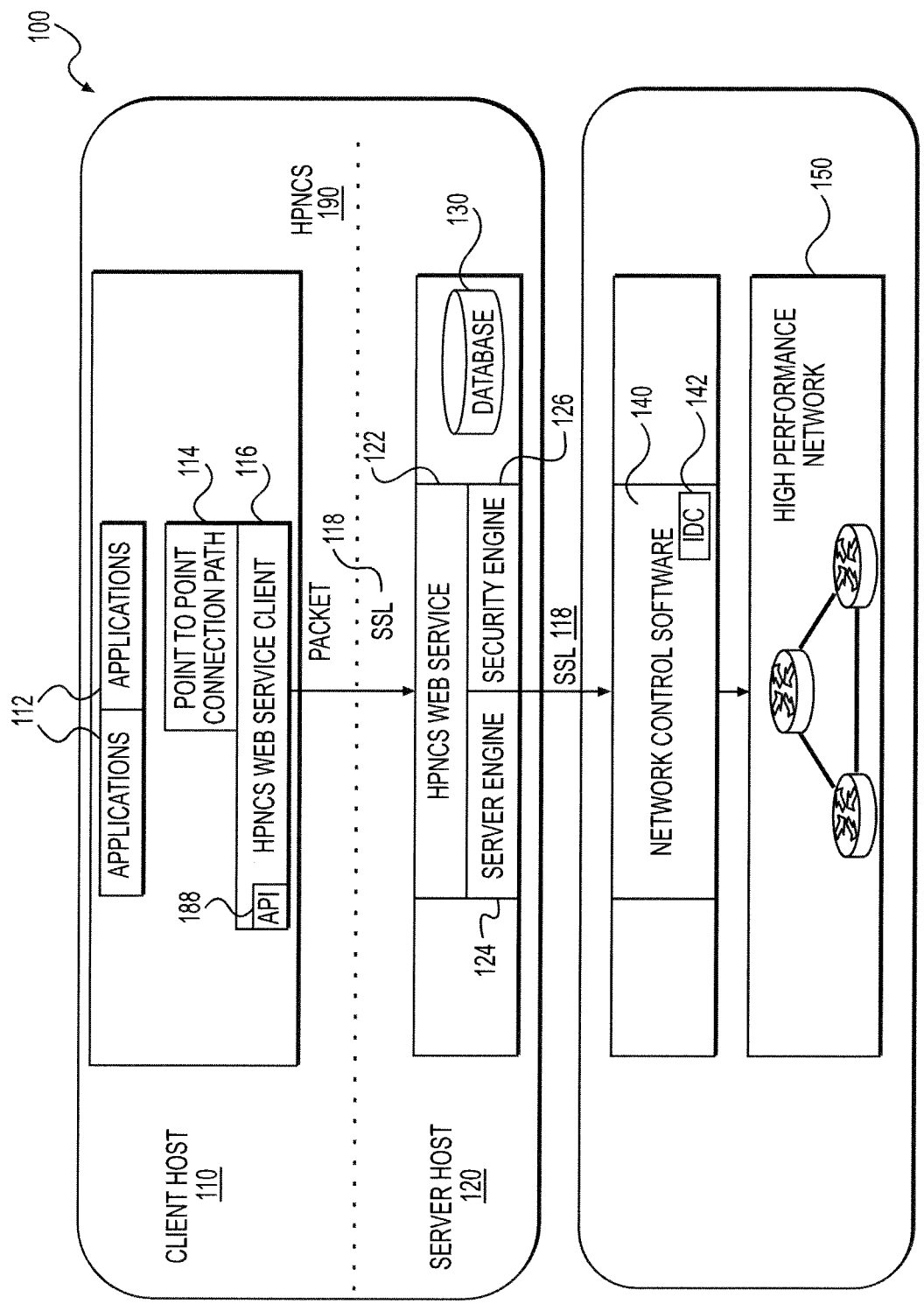
FIG. 1 illustrates an embodiment of an exemplary system for providing an high performance network connection service (HPNCS) for distributed computing applications.

As noted above, high performance networks play an important role in the success of mission critical, net-centric operations. With their high bandwidth, low latency, and high availability, high performance networks provide great benefits to organizations that rely on distributed computing and grid computing environments. High performance networks with dynamic circuit connection capabilities can make expensive high performance network connection resources more accessible and manageable. Distributed computing allows one or more applications to make use of computing and data resources located at widely dispersed locations. One of the enabling technologies for widespread adoption of distributed computing in high performance applications is efficient high bandwidth, low latency networking. With the widespread deployment of dense wavelength division multiplexing, networks are beginning to have enough capacity to dedicate bandwidth to individual data flows and applications. These dynamically allocated resources provide distributed applications with high bandwidth and low latency while using network resources efficiently. For example, the Internet2 optical backbone network provides dense wavelength division multiplexing links with bandwidth capability up to 100 Gbps, of which some are available for dynamic circuit reservation.

A system and method are disclosed for providing a high performance network connection service (HPNCS) for distributed computing applications ("distributed applications"). The HPNCS provides a network abstraction layer to the distributed applications and provides an interface to the underlying high performance on-demand dynamic circuit network (DCN). The HPNCS may relieve performance bottleneck problems encountered by the distributed applications due to the limited available networking bandwidth. The HPNCS may be used by distributed applications that need to access dedicated high performance network connection resources, such as DCN circuits, on an as-needed basis without over consuming expensive network resources.

The HPNCS may provide an easy to use application program interface (API) to application developers ("users"), who do not need to know the technical details about the underlying networking technology. A user can easily request high performance network connection resources, such as a DCN circuit, directly from an application code using API methods, such as Java, C++, and the like. The HPNCS may use a software component based layered architecture. Complex software systems may be needed in order to support different functionalities. A layered architecture may allow the use of loosely coupled software components or modules of certain specific functionality to construct a complex software system. This layered architecture is more scalable and flexible than a tightly integrated software system where each functional component is tightly coupled together to provide the system functionality. The HPNCS may provide user level security capability, including authentication and authorization on network resources (i.e., bandwidth allocation) according to user requests.

FIG. 1 illustrates an embodiment of an exemplary system 100 for providing an HPNCS 190 for distributed computing applications. The HPNCS 190 may be a service layer software component in a high performance network architecture. The HPNCS 190 may provide an abstraction layer of service interface to distributed applications 112.

The HPNCS 190 may be deployed at a server host 120. The distributed applications only need to have an HPNCS web service client package 116 on a local host 110 to invoke API calls. Secure API messages, which are transparent to an API caller (i.e., caller or user), may be used to communicate between the HPNCS web service 122 on the server host 120 and the HPNCS web service client package 116 on the client host 110. From the distributed application 112, the API caller may request to establish on-demand point-to-point DCN circuit connections through an HPNCS web service client package 116 with guaranteed bandwidth and stable low latency. The bandwidth of a DCN circuit is typically allocated at provisioning time, and is segregated from other network traffic. Therefore, the bandwidth is typically guaranteed for one application. The network latency of a DCN circuit typically only depends on the physical distance of source and destination, and the switching hardware, and is independent of regular network routing and switching. The distributed application 112 may optionally use a point-to-point connection path 114 to communicate with the HPNCS web service client package 116.

The HPNCS 190 may provide, for example, an API 188, to the underlying high performance networks infrastructure for circuit connection provisioning. For example, a DCN infrastructure provided by Internet2 may be used. The Internet2 DCN may provide on-demand DCN circuit connection provisioning capability through an inter-domain controller (IDC) 142, which is an instance of network control software 140 shown in FIG. 1. The HPNCS 190 may interface with other network control software 140, providing a transparent abstraction layer between the underlying network and applications 112 using a simple API.

The API 188 may be easy for application developers to use without requiring detailed knowledge of how the on-demand DCN circuit connection is set up over the high performance networks across multiple network administration domains. The simple APIs implemented by embodiments of the system 100, such as API 188, allow distributed applications to set up on-demand point-to-point DCN circuit connections at runtime, then access and transfer datasets, and finally disconnect the DCN circuit connections when the DCN circuit is no longer needed.

The HPNCS web service client package 116 may communicate with an HPNCS web service 122 located on the server host 120. The HPNCS web service 122 may include a server engine 124. The server engine 124 provides a network provisioning abstraction interface between a physical network layer and application software by providing an easy-to-use API, such as API 188, to an application layer. The server engine 124 may also communicate with the underlying network control software for circuit provisioning. The server engine architecture enables it to communicate with different physical networks through different network control software adapters, and makes the underlying physical networks transparent to the application software.

To efficiently manage dynamic network resources and security, the HPNCS web service 122 may include a security engine 126 that utilizes public key infrastructure (PKI) and role based authorization. The security engine 126 may enforce a security policy on the API caller using, for example, secure socket layer 118. For example, when the HPNCS API 188 is invoked by an application 112, the security engine 126 may first authenticate the API caller of the application 112 by accessing information in a database 130, for example. Only valid API callers may be authenticated by the security engine 126. Each valid API caller may then be associated with a predefined authorization level for which certain network resources, such as circuit connection bandwidth, are assigned. The API caller may then be authorized before the request to set up an on-demand DCN circuit connection is granted. If the API caller requests to set up a DCN circuit with a bandwidth larger than his or her authorized permission, the request may be rejected by the HPNCS 190.

After the caller is authenticated using, for example, Secure Sockets Layer (SSL) 118, the HPNCS web service 122 may be connected to a high performance network 150 through the network control software 140. The network control software 140 may configure and provision physical network resources, such as network switches, routers, and the like. The network control software 140 may also act as an abstraction layer between the underlying physical network devices on the high performance network 150 and the upper layer components, such as the HPNCS server engine 124, to manage and provision the physical network resources. The network control software 140 allows for dynamic circuit provisioning.

Figure 2:
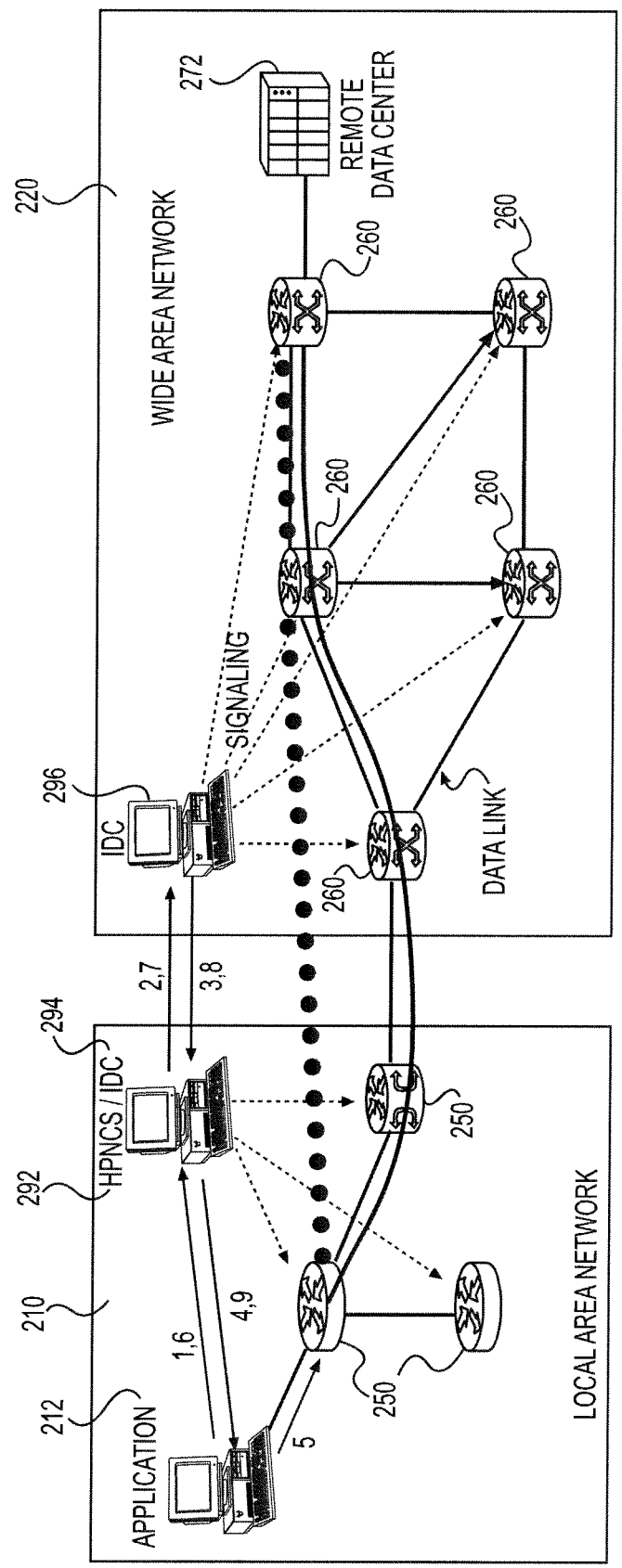
FIG. 2 illustrates an embodiment of an exemplary network connection utilizing the HPNCS of FIG. 1.

FIG. 2 illustrates an embodiment of an exemplary network connection utilizing the HPNCS 190. An application 212 running at a location needs to access data from a remote data center 272 that is geographically separated from the application 212. The HPNCS 190 enables the application 212 to setup a high performance connection between the application 212 and the remote data center 272 on-demand, and access the data with reliable performance.

Referring to FIG. 2, the application 212 in a local area network (LAN) 210 sends a request to a local HPNCS 292 to set up, for example, a DCN circuit (arrow 1). The local HPNCS 292 interacts with a local IDC 294, which signals the network control software 140 to compute local domain paths and reserve resources. The local IDC 294 further sends a request to its peering domain IDC 296 in a wide area network (WAN) to compute paths, and allocate and reserve resources (arrow 2). The peering domain IDC 296 completes the reservation and returns path information to the local HPNCS 292 (arrow 3). The local HPNCS 292 returns to the application 212 with a status indicating that the point-to-point DCN circuit is established (arrow 4). The application 212 starts to transfer data from local nodes 250 to destination nodes 260, and vice versa (arrow 5). The application 212 sends a request to the local HPNCS 294 to release the DCN circuit after completion of data transfer (arrow 6). The local HPNCS 294 releases local domain network resources, and requests its peering domain IDC 296 to release the DCN circuit (arrow 7). The peering domain IDC 296 releases network resources in its domain, and the DCN circuit is released (arrow 8). The point-to-point DCN circuit is released, and control is returned to the application 212 (arrow 9).

Figure 3:
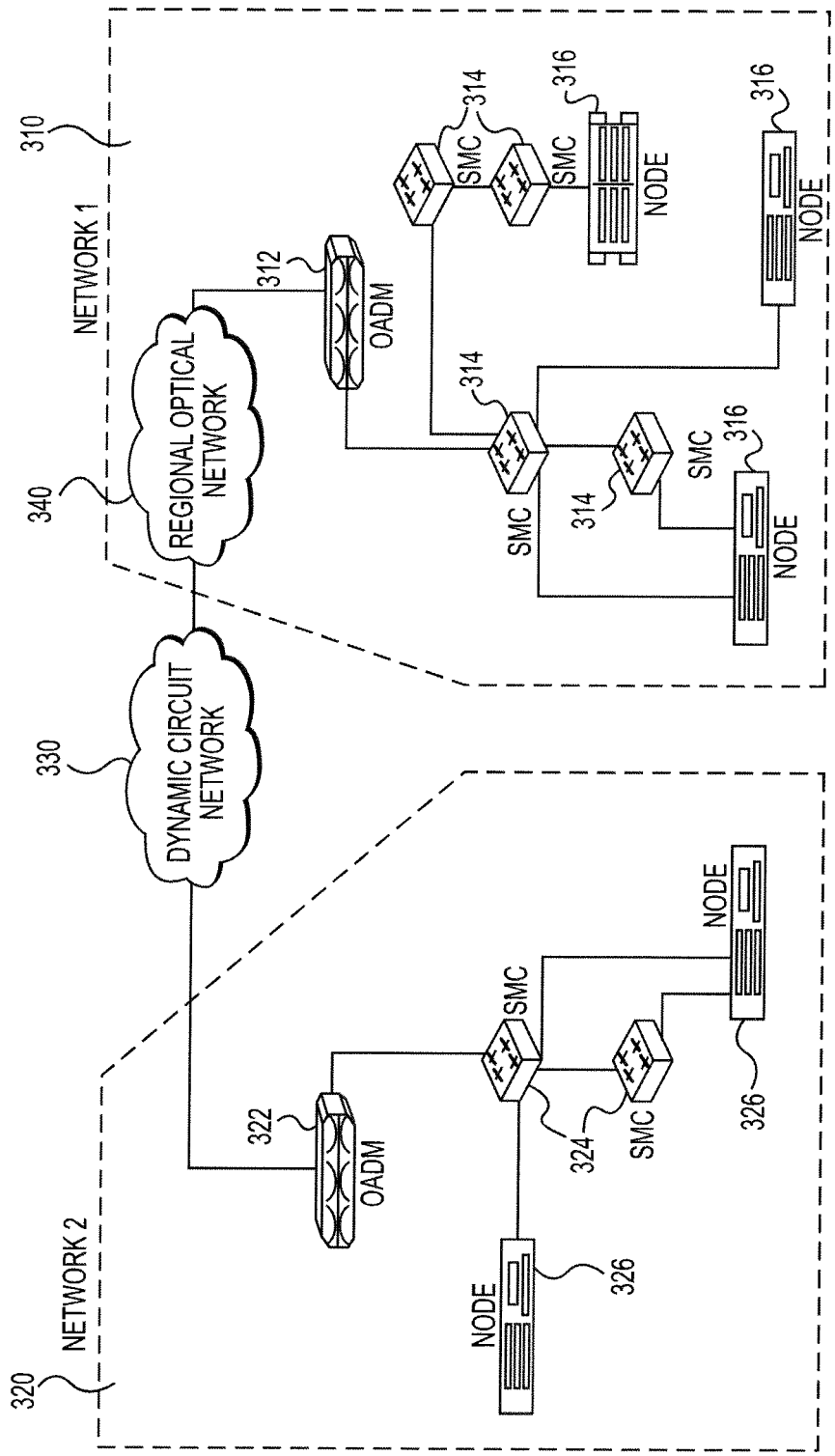
FIG. 3 illustrates an exemplary dynamic circuit network (DCN) configuration utilizing the HPNCS of FIG. 1.

FIG. 3 illustrates an exemplary DCN configuration utilizing the HPNCS 190. Two DCN circuit networks are shown in FIG. 3, Network1 310 and Network2 320. The fiber distance between these networks is approximately 1300 miles. Each network has its own DCN domain using a local IDC to manage local circuit provisioning. The local IDC at each network communicates with its peer DCN IDC for point-to-point circuit connection provisioning.

A regional optical network 340 provides regional DCN connectivity for Network1 310. The regional optical network 340 is a connector and gateway to a DCN 330, such as an Internet2 DCN. Network2 320 directly connects to the DCN 330 using, for example, a point of presence (not shown). The maximum bandwidth for DCN circuit connections between the two networks may be 2.5-10 Gbps without hardware change.

A layer 1 connection means a physical link between devices, such as network switches, routers, and the like. A layer 2 connection means a data link between devices, and is typically a point-to-point connection with no routing. A layer 3 connection means a network layer that transfers variable length data sequences from a source to a destination using one or more networks. Once a layer 2 connection is provisioned, network resources, such as bandwidth, are allocated to the data link and is not shared by other applications. In other words, only the application accessing the source or destination of the layer 2 connection can access the bandwidth. In the case of a layer 3 connection, the network bandwidth is typically shared by many applications. Therefore, a layer 2 connection can provide bandwidth guarantee for an application.

The DCN 330 is a layer 2 data link connection. As a result, once an on-demand DCN circuit is set up between the two sites, the bandwidth may be guaranteed during the reservation period. After the DCN circuit is established; the latency between the two networks may be a steady 41 milliseconds. Unlike layer 2 networks, a layer 3 network is a packet switching network. Packets from the same source may be routed to different network segments to reach a destination. There is no fixed data path for application data packets to use. The router along the path determines the next network segment to send the packet. Each network segment may have different bandwidth and congestions. Therefore, there is no bandwidth guarantee. Further, in a layer 3 network, latency may depend on the network traffic pattern, packet queue priority, class of service (CoS), and the like. For example, congestion on a link segment may vary the network latency. The network latency between the networks in layer 3 network connectivity may vary from approximately 44 milliseconds to more than 100 milliseconds. Therefore, latency is not stable in a layer 3 network.

Network2 320 includes an optical add/drop multiplex (OADM) 322 that provides connections between DCN 330 and switches 324 and computer server nodes 326 within the local network, i.e., Network2 320. Switches 324 may be, for example, SMC 10G Ethernet and SMC 1G Ethernet switches. Switches 324 may be controlled by network control software 140 using, for example, virtual label switch router (VLSR) interfaced to IDC for DCN circuit provisioning.

Network1 310 may have a similar configuration that includes an OADM 312, switches 314 and computer server nodes 316.

Figure 4:
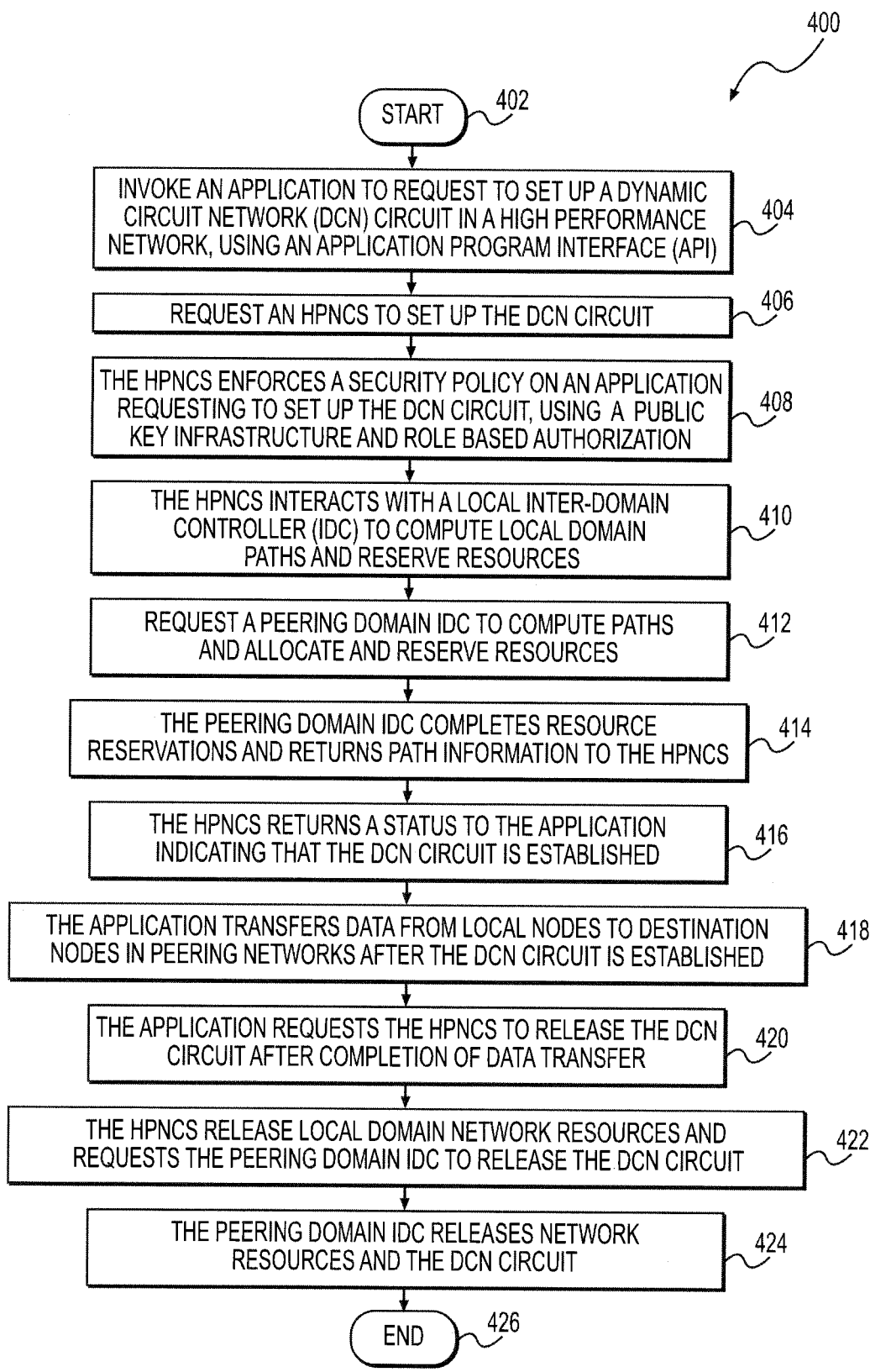
FIG. 4 is a flow chart illustrating an exemplary embodiment of a method for providing an HPNCS for distributed computing applications.

FIG. 4 is a flow chart illustrating an exemplary embodiment of a method 400 for providing an HPNCS for distributed computing applications. The method 400 starts (402) by invoking an application in response to user command to request to set up a DCN circuit in a high performance network, using an API (block 404). The application may request an HPNCS to set up the DCN circuit (block 406). The HPNCS may enforce a security policy on an application requesting to set up the DCN circuit, using a public key infrastructure and role based authorization (block 408). The HPNCS may interact with a local IDC to compute local domain paths and reserve resources (block 410). The HPNCS may request a peering domain IDC to compute paths and allocate and reserve resources (block 412). The peering domain IDC may complete resource reservations and return path information to the HPNCS (block 414). The HPNCS may return a status to the application indicating that the DCN circuit is established (block 416). The application may transfer data from local nodes to destination nodes in peering networks after the DCN circuit is established (block 418). The application may request the HPNCS to release the DCN circuit after completion of data transfer (block 420). The HPNCS may release local domain network resources and request the peering domain IDC to release the DCN circuit (block 422). The peering domain IDC may release network resources and the DCN circuit (block 424). The method ends in 406.

HPNCS 190 may be used by applications that use different dataset sizes, apply different data transactions, and have different software architectures. For example, an exemplary application that is invoked to request setting up a DCN circuit may be a line of sight network optimization tool (LNOT), which accesses a large database of indexed cloud/no-cloud assessments. This database is large and co-located at a facility where a ground station for the meteorological satellite data, computational resources, and technical expertise to run and maintain the cloud detection algorithms is sited. The LNOT application optimizes station locations over this database to identify the latitude/longitudes of a given number of stations that provide the highest joint N-wise cloud-free lines of sight.

Conceptually, a new remote user, such as an analyst or scientist at another facility, may depend on this data. In the past, relatively sluggish network performance would dictate that a separate copy of the entire database would be replicated at the work-site for this new remote user; possibly shipped by hard-drive over physical mail. This would meet basic needs, but leaves issues with configuration management of the dataset as well as access control. What the new remote user wants is convenient high-speed network access to the dataset, not a duplicate of the dataset.

The LNOT application may be a proxy for such a new remote user. In the course of execution, the LNOT application frequently accesses this database by direct file system reads through a set of interfaces written in, for example, the C language, using, for example, standard C input/output (I/O) library calls. To implement embodiments of the system 100, a set of wrappers may be written to provide nearly identical function-call interfaces so that the same baseline of LNOT code may be compiled to read either locally resident disk-storage or remotely resident across-network files, thus making minimal architectural changes to the LNOT body of code. In addition, a simple Internet protocol suite (TCP/IP) server application may be written to serve file requests from the cloud database server side.

Another exemplary application that is invoked to request setting up a DCN circuit may be a whole sky imagery (WSI) application. WSI application aggregates sky-color statistics by azimuth and elevation from minute by minute images collected from a fisheye camera system collecting data in blue, red and near-IR bands. This data is two orders of magnitude greater in volume per access than the LNOT cloud/no-cloud datasets, and may be a more rigorous test of the DCN bandwidth capacity.

Yet another exemplary application that is invoked to request setting up a DCN circuit may be a weather research and forecasting (WRF) model. WRF model may be run at a high performance cluster center, such as at Network1 310, and subsequently shipped to another data center, such as at Network2 320, for ingestion into a gas and particulate transport/diffusion model (CALPUFF) used to model smoke emissions from wildfires. In an experiment, the area of 1340× 1340 km is selected for the WRF run with the grid resolution at 4×4 km. A total of 60 hours' simulation with a step size of one hour takes 14 hours high performance cluster computing time using 200 processors. A total dataset of approximately 60 GB is generated by these WRF runs. The subsequent CALPUFF application takes the WRF datasets as input and simulates transport and dispersion over 400×400 km area with a resolution of 4×4 km for 48 hours forecast of forested fire emissions. The output of the CALPUFF application is then visualized to support decision making processes.

Figure 5:
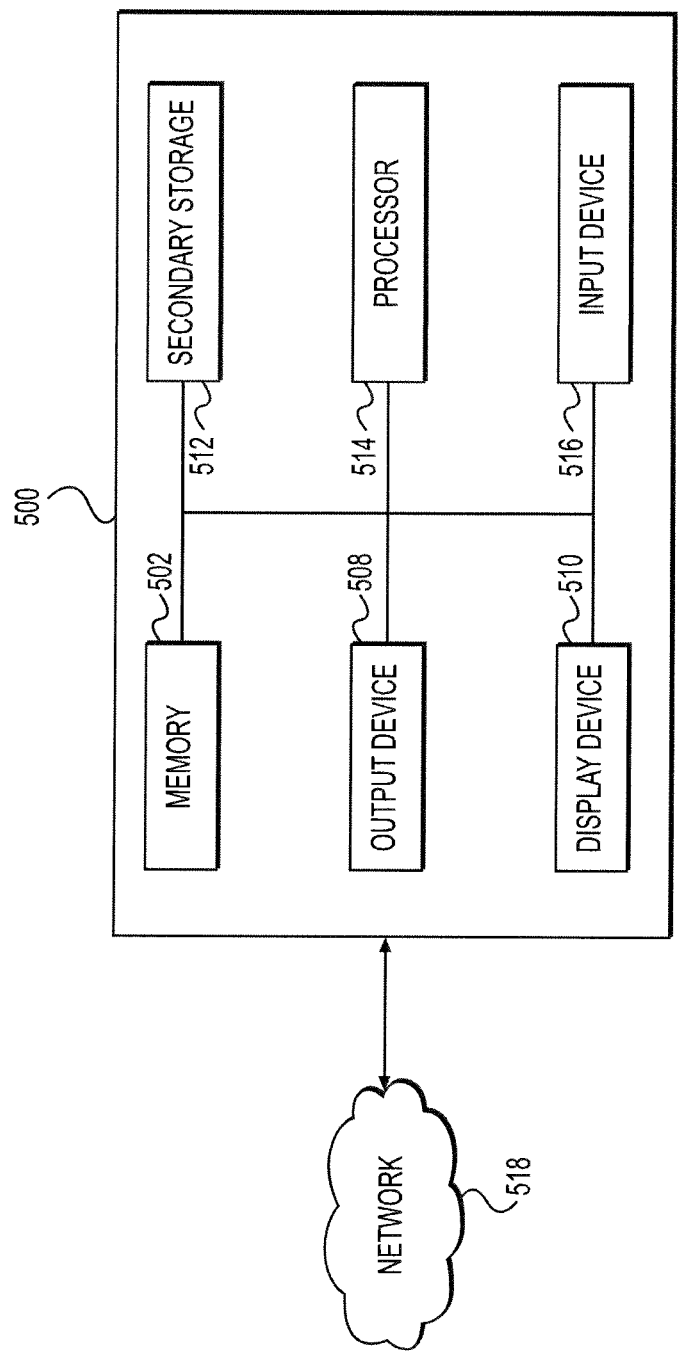
FIG. 5 illustrates exemplary hardware components of a computer that may be used in connection with the method for providing an HPNCS for distributed computing applications.

FIG. 5 illustrates exemplary hardware components of a computer 500 that may be used in connection with the method 400 for providing an HPNCS for distributed computing applications. The computer 500 includes a connection with a network 518 such as the Internet or other type of computer network. The computer 500 typically includes a memory 502, a secondary storage device 512, a processor 514, an input device 516, a display device 510, and an output device 508.

The memory 502 may include random access memory (RAM) or similar types of memory. The secondary storage device 512 may include a hard disk drive, floppy disk drive, CD-ROM drive, or other types of non-volatile data storage, and may correspond with various databases or other resources. The processor 514 may execute information stored in the memory 502, the secondary storage 512, or received from the Internet or other network 518. The input device 516 may include any device for entering data into the computer 500, such as a keyboard, keypad, cursor-control device, touch-screen (possibly with a stylus), or microphone. The display device 510 may include any type of device for presenting a visual image, such as, for example, a computer monitor, flat-screen display, or display panel. The output device 508 may include any type of device for presenting data in hard copy format, such as a printer, or other types of output devices including speakers or any device for providing data in audio form. The computer 500 can possibly include multiple input devices, output devices, and display devices.

Although the computer 500 is shown with various components, one skilled in the art will appreciate that the computer 500 can contain additional or different components. In addition, although aspects of an implementation consistent with the method for providing an HPNCS for distributed computing applications are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 500 to perform a particular method.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for providing a high performance network connection service (HPNCS) for distributed computing applications, comprising:
    an HPNCS implemented by a computer including a processor and a memory, comprising:
        an HPNCS web service located on a server host that is in communication with an HPNCS web service client package located on a client host,
        wherein the HPNCS web service client package communicates with an application located on the client host using a point-to-point connection path, and communicates with the HPNCS web service located on the server host to request to set up a dynamic circuit network (DCN) circuit in a high performance network, and
        wherein the application transfers data from local nodes to destination nodes in peering networks after the DCN circuit is established, and requests the HPNCS to release the DCN circuit in response to the completion of the data transfer.

2. The system of claim 1, wherein the HPNCS further comprises a server engine for providing a network provisioning abstraction interface between a physical network layer and application software.

3. The system of claim 1, wherein the HPNCS further comprises a security engine that enforces a security policy on an application requesting to set up the DCN circuit.

4. The system of claim 3, wherein the security engine uses a public key infrastructure and role based authorization to enforce the security policy.

5. The system of claim 1, wherein the application located on the client host is invoked by a user command that requests to set up the DCN circuit.

6. The system of claim 5, where the HPNCS further comprises an application program interface (API) to invoke the application located on the client host.

7. The system of claim 1, further comprising network control software for configuring and provisioning physical network resources and acting as an abstraction layer between underlying physical network devices and upper layer components to manage and provision the physical network resources.

8. The system of claim 1, further comprising:
    a local inter-domain controller (IDC) that computes local domain paths and reserves resources; and
    a peering domain IDC,
    wherein the local IDC sends a request to the peering domain IDC to compute paths and allocate and reserve resources, wherein the peering domain IDC completes resource reservations and returns path information to the HPNCS, and wherein the HPNCS returns a status to the application indicating that the DCN circuit is established.

9. The system of claim 8, wherein the HPNCS releases local domain network resources and requests the peering domain IDC to release the DCN circuit, and wherein the peering domain IDC releases network resources and releases the DCN circuit.

10. A computer implemented method for providing a high performance network connection service (HPNCS) for distributed computing applications, the method implemented by a computer including a processor and a memory, the method comprising:
    requesting an HPNCS to set up a dynamic circuit network (DCN) circuit in a high performance network,
    the HPNCS interacting with a local inter-domain controller (IDC) to compute local domain paths and reserve resources, using the processor;
    requesting a peering domain IDC to compute paths and allocate and reserve resources;
    the HPNCS returning a status to the application indicating that the DCN circuit is established;
    the peering domain DC completing resource reservations and returning path information to the HPNCS;
    the application transferring data from local nodes to destination nodes in peering networks after the DCN circuit is established; and
    requesting the HPNCS to release the DCN circuit in response to the completion of the data transfer.

11. The method of claim 10, further comprising:
    the HPNCS releasing local domain network resources and requesting the peering domain IDC to release the DCN circuit; and
    the peering domain IDC releasing network resources and the DCN circuit.

12. The method of claim 10, further comprising enforcing a security policy on an application requesting to set up the DCN circuit.

13. The method of claim 12, wherein the enforcing step uses a public key infrastructure and role based authorization to enforce the security policy.

14. The method of claim 10, further comprising invoking an application to set up the DCN circuit, using an application program interface (API).

15. A non-transitory computer readable medium providing instructions for providing a high performance network connection service (HPNCS) for distributed computing applications, the instructions comprising:
    requesting an HPNCS to set up a dynamic circuit network (DCN) circuit in a high performance network,
    the HPNCS interacting with a local inter-domain controller (IDC) to compute local domain paths and reserve resources;
    requesting a peering domain IDC to compute paths and allocate and reserve resources;
    the HPNCS returning a status to the application indicating that the DCN circuit is established;

the application transferring data from local nodes to destination nodes in peering networks after the DCN circuit is established; and requesting the HPNCS to release the DCN circuit in response to the completion of the data transfer.

16. The computer readable medium of claim 15, further comprising:

instructions for releasing local domain network resources and requesting the peering domain IDC to release the DCN circuit; and instructions for releasing network resources and the DCN circuit.

17. The computer readable medium of claim 15, further comprising instructions for enforcing a security policy on an application requesting to set up the DCN circuit.

* * * * *